(12) United States Patent
Yashiki et al.

(10) Patent No.: US 6,773,155 B1
(45) Date of Patent: Aug. 10, 2004

(54) VEHICLE HEADLAMP

(75) Inventors: Satoru Yashiki, Shimizu (JP); Toru Nakayama, Shimizu (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/342,845

(22) Filed: Jan. 15, 2003

(30) Foreign Application Priority Data

Jan. 17, 2002 (JP) ...................................... 2002-008571

(51) Int. Cl.[7] ............................................... B60Q 1/00
(52) U.S. Cl. ..................... 362/548; 362/549; 362/226
(58) Field of Search ................................. 362/226, 548, 362/549, 507, 519; 313/318.11

(56) References Cited

U.S. PATENT DOCUMENTS

| | | | | |
|---|---|---|---|---|
| 5,584,559 A | * | 12/1996 | Toda | 362/539 |
| 6,008,584 A | * | 12/1999 | Kodaira et al. | 315/82 |
| 6,082,883 A | * | 7/2000 | Tatsumi et al. | 362/548 |
| 6,109,773 A | * | 8/2000 | Nace | 362/548 |
| 6,540,388 B2 | * | 4/2003 | Aida et al. | 362/548 |
| 6,595,672 B2 | * | 7/2003 | Yamaguchi | 362/547 |
| 2001/0015897 A1 | * | 8/2001 | Aida et al. | 362/519 |
| 2003/0117811 A1 | * | 6/2003 | Mock et al. | 362/519 |

FOREIGN PATENT DOCUMENTS

JP 2000-100207 4/2000

* cited by examiner

Primary Examiner—Thomas M. Sember
(74) Attorney, Agent, or Firm—Koda & Androlia

(57) ABSTRACT

A vehicle headlamp that includes a lamp body, a reflector which is tiltably supported by the lamp body, a discharge bulb which is fixed to the reflector, and a socket which is engaged with and attached to the discharge bulb and connects the discharge bulb to a lighting circuit. The lamp body is formed with an opening in its rear portion, and a cover that is attached in a removable fashion to the lamp body and closes the opening has a bar-shaped protrusion that is provided on the inner surface of cover; and when the cover is attached to the lamp body, the bar-shaped protrusion comes in contact with or is positioned near the socket and prevents the socket from rotating.

13 Claims, 7 Drawing Sheets

VEHICLE HEADLAMP

BACKGROUND OF THE INVENTION

1. Field of the Invention

The present invention relates to a vehicle headlamp and more particularly to a vehicle headlamp in which a power supply socket is attached to the discharge bulb that is used as a light source thereof.

2. Prior Art

A typical vehicle headlamp uses a discharge bulb as its light source. In such a vehicle headlamp, the discharge bulb is attached to a reflector, and a power supply socket (merely called a "socket") is brought into an engagement with a base portion of the discharge bulb by rotation so that the socket is attached to the discharge bulb.

In this vehicle headlamp, if the rotation of the socket is incomplete or improper due to the reasons for, for example, lack of experience of an operator, the socket would fall, or a contact failure would occur to the terminals used in the headlamp.

For the purposes of solving such problems, one of known headlamps takes a unique structure. In this headlamp, a restriction wall is formed on a cover that closes an opening formed in the lamp body. This opening is used when, for instance, attaching a discharge bulb to a reflector which is installed inside the lamp body and when attaching a power supply socket to the discharge bulb. The restriction wall is formed so that it surrounds most of the side surface of a power supply socket when the cover is attached to the lamp body to close the openig. Thus, when the cover is attached to the lamp body in a state where the power supply socket is normally attached, and the opening is closed by the cover, then the restriction wall of the cover is engaged with the side surface of the power supply socket and prevents the power supply socket from rotating. As a result, unless the power supply socket is not rotated completely to a normal attachment position, the restriction wall interferes with the power supply socket, and the cover is not attached to the lamp body. On the other hand, if the power supply socket is rotated completely to the normal attachment position and is attached to the discharge bulb, and the cover is attached to the lamp body, then the power supply socket becomes incapable of rotating.

Accordingly, in the above headlamp, it is possible to avoid the connection between the discharge bulb and the power supply socket from being left incomplete. Also, falling of the socket due to the loosening of the power supply socket or a contact failure of the terminal after the power supply socket is attached normally to the discharge bulb can be avoided.

However, generally in a vehicle headlamp, it is necessary to tilt the reflector in order to adjust the irradiation axis (or to make an adjustment of the optical axis). In the vehicle headlamp designed so as to prevent the power supply socket from loosening by the restriction wall that is provided in the cover as described above, there is a possibility that the optical axis is not adjusted as expected because of the interference that occurs between the power supply socket and the restriction wall of the cover when the reflector is tilted. Another problem in such a vehicle headlamp is that, upon assembling, it is difficult to attach the cover to the lamp body smoothly since the restriction wall comes into contact with the power supply socket.

SUMMARY OF THE INVENTION

It is, therefore, an object of the present invention to provide a vehicle headlamp that avoids incomplete or improper attachment of a power supply socket to a discharge bulb.

It is another object of the present invention to provide a vehicle headlamp that avoids a fall of the power supply socket from the discharge bulb after the power supply socket is attached to the discharge bulb.

It is still another object of the present invention to provide a vehicle headlamp that avoids connection failure between the discharge bulb and the power supply socket.

It is a further object of the present invention to provide a vehicle headlamp that prevents hindrance to a tilting movement of the reflector to which the discharge bulb is attached.

In order to accomplish the above objects, in the vehicle headlamp according to the present invention, a bar-shaped protrusion portion is provided on a cover that closes an opening formed in the back of the lamp body, thus allowing the bar-shaped protrusion to come into contact with or to be positioned adjacent to a part of the power supply socket when the cover is attached to the lamp body, thus preventing the power supply socket from rotating.

With the above structure of the vehicle headlamp according to the present invention, the bar-shaped protrusion portion interferes with the power supply socket and thus disallows the cover to be attached to the lamp body unless the power supply socket is attached to the discharge bulb in a normal state. Therefore, an incomplete attachment of the power supply socket to the discharge bulb is avoided.

Further, once the power supply socket is attached to the discharge bulb in the normal state and the cover is attached to the lamp body, then the power supply socket is prevented from rotating by the bar-shaped protrusion portion of the cover. As a result, falling of the power supply socket due to loosening of the power supply socket or a connection failure between the discharge bulb and the power supply socket is avoided.

Moreover, the protrusion portion that is provided in the cover is a bar type, and it is not a wall type that contacts the most part of the side face of the power supply socket as seen in prior art headlamp. Therefore, the protrusion portion would not hinder the reflector from tilting.

DETAILED DESCRIPTION OF THE INVENTION

Hereinafter, embodiments of the vehicle headlamp according to the present invention will be described with reference to the accompanying drawings.

Figure 1:
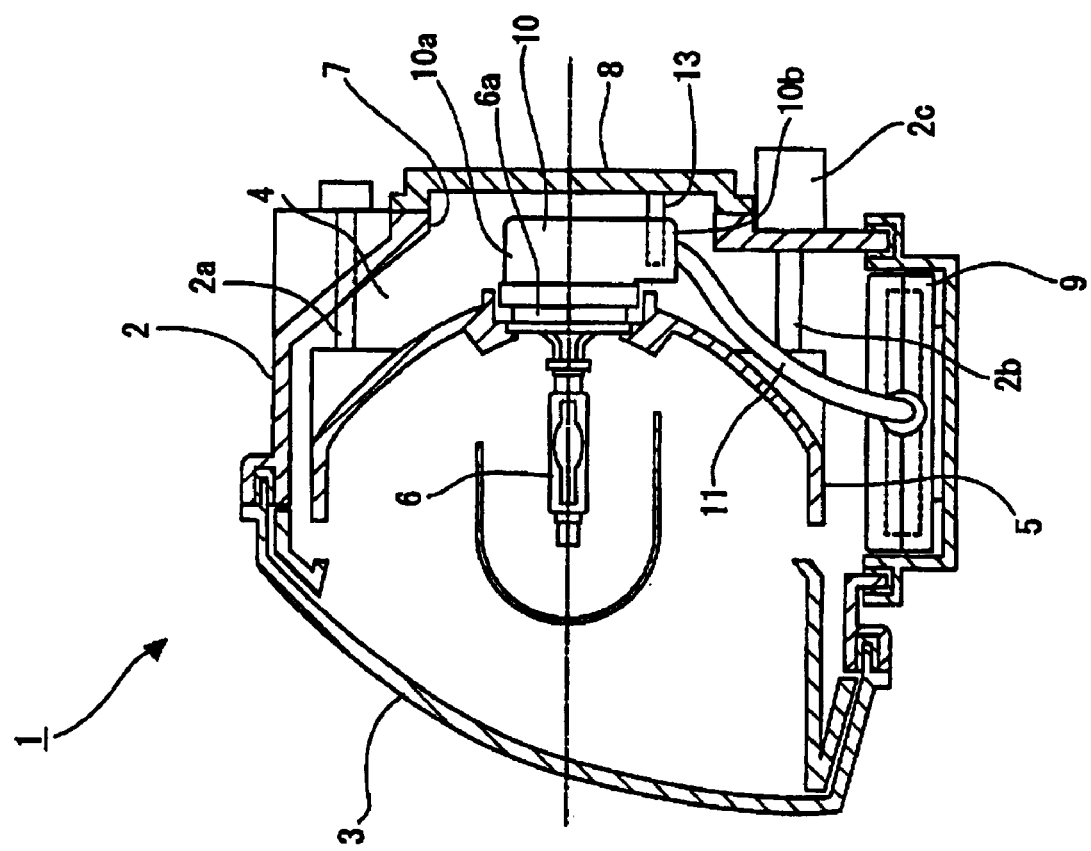
FIG. 1 is an overall longitudinal sectional view of the vehicle headlamp according to the first embodiment of the present invention.
Figure 2:
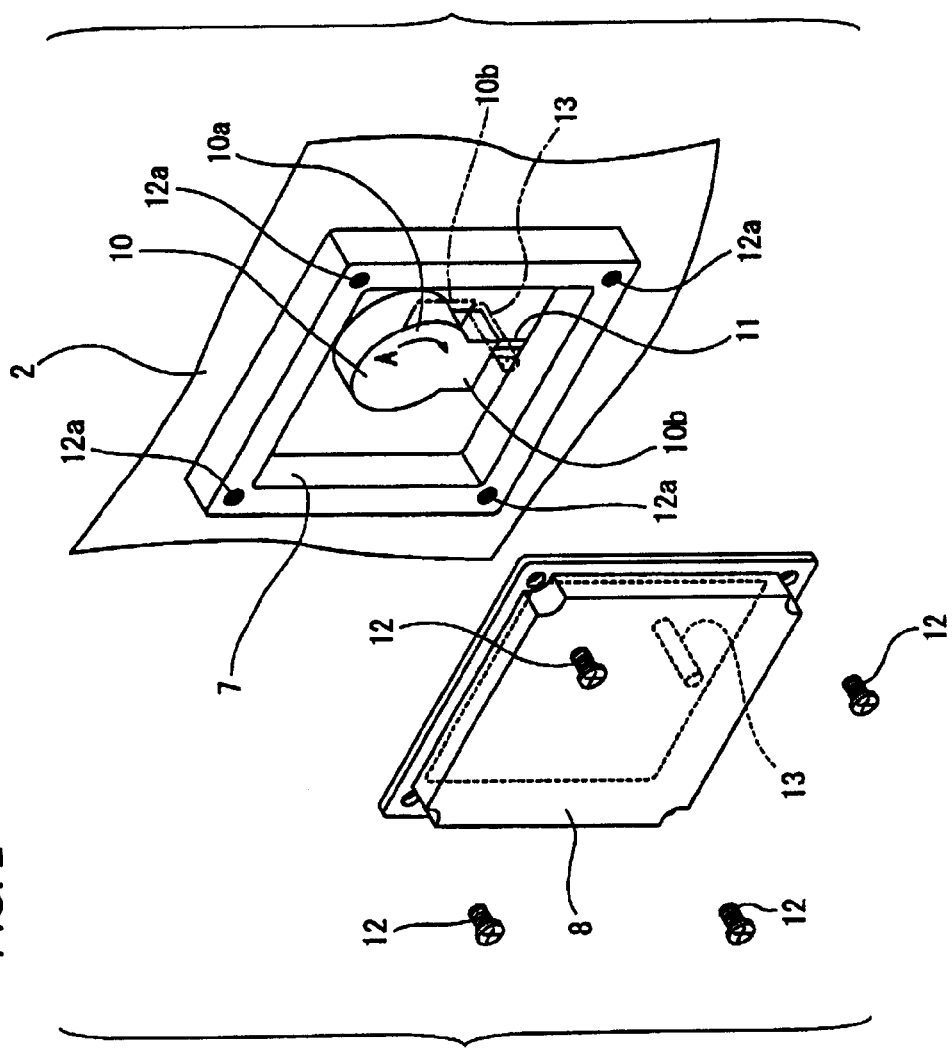
FIG. 2 is an oblique view of a main portion of the first embodiment of the vehicle headlamp, particularly showing the cover separated from the lamp body.

FIG. 1 and FIG. 2 show the first embodiment of the vehicle headlamp according to the present invention, and FIGS. 3 to 8 show a modified example of the first embodiment.

The overall configuration of the vehicle headlamp of the present invention will be describe first with reference to FIG. 1.

The vehicle headlamp 1 comprises a lamp body 2 and a lens 3. The lamp body 2 opens toward the front (the left side of FIG. 1), and the lens 3 is attached to the lamp body 2 so that the lens 3 covers the front opening of the lamp body 2. A lamp chamber 4 is thus formed by the lamp body 2 and the lens 3. A reflector 5 is tiltably disposed in the lamp chamber 4, and a discharge bulb 6 is detachably attached to the center of the rear portion of the reflector 5.

The reflector 5 is supported by the lamp body 2 at three points in total by an adjusting screw 2a which is rotatably supported by the lamp body 2, a leveling actuator 2c which moves an axle 2b forward and rearward by remote control, and a rotation support point portion (not shown). The reflector 5 is appropriately tilted with respect to the lamp body 2 by rotating the adjusting screw 2a during initial adjustment of the optical axis of the lamp and by driving the leveling actuator 2c during the correction of the inclination of the optical axis due to the inclination of a vehicle.

An opening 7 is formed in the center of the rear portion of the lamp body 2. The opening 7 is provided at a position that faces the base portion 6a of the discharge bulb 6. Through this opening 7, the discharge bulb 6 is attached to and detached from the reflector 5, and also a power supply socket (or merely a "socket") 10 to be described later is attached to and detached from the discharge bulb 6. The opening 7 is closed by a detachable cover 8.

A lighting circuit unit 9 is disposed in the lower portion of the light chamber 4, and a lighting circuit of the lighting circuit unit 9 and a power supply socket 10 are connected by a cord 11. The power supply socket 10 is detachably attached to the base portion 6a of the discharge bulb 6. Thus, when the power supply socket 10 is attached to the base portion 6a of the discharged bulb 6, an electric power is applied to the discharge bulb 6 from the lighting circuit unit 9.

The power supply socket 10 is, as best seen from FIG. 2, comprised of a main section 10a and a cord connecting section 10b. The cord connecting section 10b is substantially a rectangular shape and protrudes from a peripheral portion of the main section 10a which has a substantially circular shape when viewed from the back. The power supply socket 10 is attached to the base portion 6a of the discharge bulb 6 by rotation. In other words, the power supply socket 10 is fitted on the base portion 6a of the discharge bulb 6 in the direction shown by the chain double-dashed line in FIG. 2; and then the power supply socket 10 is turned in the direction of arrow A so as to be oriented in the position shown by the solid line; as a result, the power supply socket 10 engages the base portion 6a of the discharge bulb 6 and is attached thereto.

The cover 8 has the size sufficient to cover the opening 7 of the lamp body 2 from the back. The cover 8 has a plate shape and is fixed to the lamp body 2 by screws 12 which are inserted at four corners into threaded holes 12a formed at four corners of the peripheral portions of the opening 7. The opening 7 is thus closed by the cover 8.

The cover 8 is provided with a bar-shaped protrusion portion 13. The protrusion portion 13 protrudes forward at a predetermined position in the front surface of the cover 8. When the cover 8 is fixed to the lamp body 2 with the power supply socket 10 rotated to a predetermined position and thus connected to the base portion 6a of the discharge bulb 6, in other words, when the cover 8 is attached to the lamp body 2 in a state that the power supply socket 10 is shown by the solid line in FIG. 2 (where the power supply socket 10 is attached normally to the discharge bulb 6), then the bar-shaped protrusion portion 13 of the cover 8 is in contact with or is positioned adjacent to the side face of the cord connecting section 10b (see the chain double-dashed line in FIG. 2) of the power supply socket 10.

More specifically, when the cover 8 is attached to the lamp body 2 in the state where the power supply socket 10 is attached to the base portion 6a of the discharge bulb 6 in the normal state, then even if the power supply socket 10 is on the verge of rotation in the loosening direction, that is, in the direction in which the connection between the discharge bulb 6 and the base portion is released (the direction opposite to the arrow A direction in FIG. 2), the power supply socket 10 is prevented from rotating in the loosening direction by the bar-shaped protrusion portion 13 of the cover 8. As a result, once the power supply socket 10 is attached to the base portion 6a of the discharge bulb 6 in the normal state and the cover 8 is also attached to the lamp body 2, then the power supply socket 10 is prevented from falling from the base portion 6a of the discharge bulb 6, or a contact failure between the power supply socket 10 and the discharge bulb 6 that would occur when the connection between the power supply socket 10 and the base portion 6a of the discharge bulb 6 becomes loosened is prevented. Moreover, since the bar-shaped protrusion portion 13 only contacts or is adjacent to apart of the power supply socket 10, the bar-shaped protrusion portion 13 does not hinder the tilting movement of the reflector 5.

Also, if the power supply socket 10 is not rotated to the predetermined position with respect to the base portion 6a of the discharge bulb 6, in other words, if the power supply socket 10 is positioned at an intermediate position between the position shown by the chain double dashed line in FIG. 2 (including the position shown by the chain double-dashed line) and the position shown by the solid line in FIG. 2 (excluding the position shown by the solid line), then even if an attempt is made to attach the cover 8 to the lamp body 2, the cover 8 cannot be attached to the lamp body 2 because the front end of the bar-shaped protrusion portion 13 of the cover 8 abuts the rear surface of the cord connecting section 10b of the power supply socket 10. Thus, it is possible to avoid the cover 8 from being attached to the lamp body 2 when the power supply socket 10 is not attached to the lamp body 2 by rotating the power supply socket 10 to a predetermined position that is shown by the solid line in FIG. 2. As a result, an operator is able to know that the power supply socket 10 is not attached in the normal state.

Figure 3:
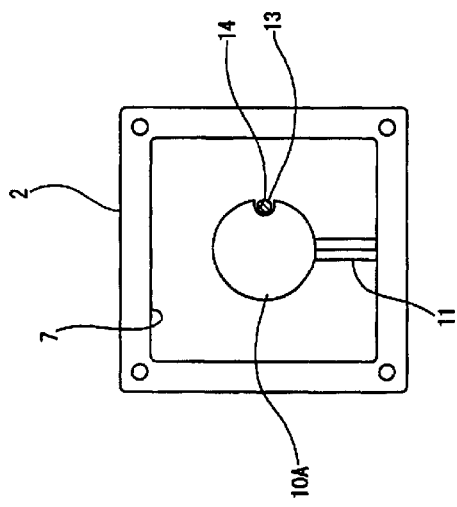
FIG. 3 is a rear view of the main portion of a modified example in which the bar-shaped protrusion portion contacts a power supply socket or is positioned adjacent to a power supply socket.

FIG. 3 shows a modified example of the bar-shaped protrusion portion contacting or being positioned adjacent to the socket.

In this modified example, the power supply socket 10A of substantially a circular shape when viewed from the back is formed with a notch portion 14 of a semicircle shape. When the cover (not shown) is attached to the lamp body 2 with the power supply socket 10A connected to the base portion (not shown) of a discharge bulb in the normal state, the bar-shaped protrusion portion 13 of the cover is positioned inside the notch portion 14 of the power supply socket 10A.

As a result, in this modified example shown in FIG. 3 as well, the power supply socket 10A which is connected to the base portion of the discharge bulb in the normal state is not rotated in the loosening direction because of the protrusion portion 13. In addition, unless the power supply socket 10A is connected to the base portion of the discharge bulb in the normal state, the cover cannot be attached to the lamp body 2.

Figure 4:
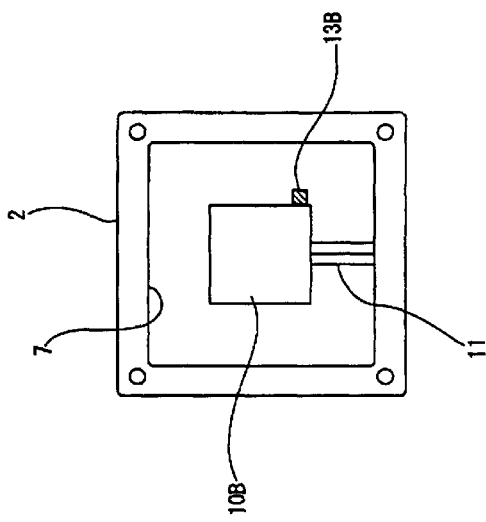
FIG. 4 is a rear view of the main portion of another modified example in which the bar-shaped protrusion portion contacts a power supply socket or is positioned adjacent to a power supply socket.

FIG. 4 shows another modified example of the bar-shaped protrusion portion of the cover that contacts or is adjacent to the socket.

In this example of FIG. 4, the power supply socket 10B has a rectangular outer shape when viewed from the back, and the bar-shaped protrusion portion 13B which is provided in the cover (not shown) has a square bar shape.

When the cover is attached to the lamp body 2 with the power supply socket 10B connected to the base portion (not shown) of the discharge bulb in the normal state, then the bar-shaped protrusion portion 13B of the cover is positioned so as to contact or to be adjacent to the side of the power supply socket 10B.

As a result, in this example of FIG. 4 as well, the power supply socket 10B, when it is connected to the base portion of the discharge bulb in the normal state, is not rotated in the loosening direction. In addition, if the power supply socket 10B is not connected to the base portion of the discharge bulb in the normal state, the cover is not attachable to the lamp body 2.

Figure 5:
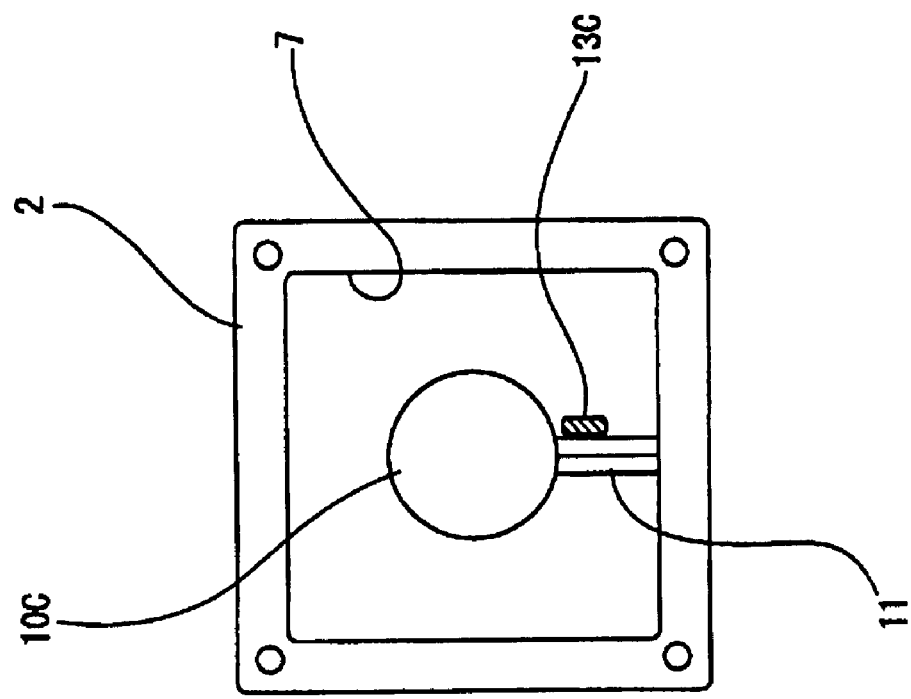
FIG. 5 is a rear view of the main portion of still another modified example in which the bar-shaped protrusion portion contacts a power supply socket or is positioned adjacent to a power supply socket.

FIG. 5 shows still another modified example of the bar-shaped protrusion portion of the cover that is in contact with or is adjacent to the socket In this example of FIG. 5, the power supply socket 10C has a circular outer shape when viewed from the back, and the bar-shaped protrusion portion 13C provided on the cover (not shown) has a substantially rectangular cross section.

When the cover is attached to the lamp body 2 with the power supply socket 10C connected to the base portion (not shown) of the discharge bulb in the normal state, the larger side face of the rectangular bar-shaped protrusion portion 13C of the cover contacts or is adjacent to the side of the cord 11 that extends from the power supply socket 10C.

As a result, in this example of FIG. 5 as well, the power supply socket 10C which is connected to the base portion of the discharge bulb in the normal state is not rotated in the loosening direction. In addition, if the power supply socket 10C is not connected to the base portion of the discharge bulb in the normal state, the cover cannot be attached to the lamp body 2.

Figure 6:
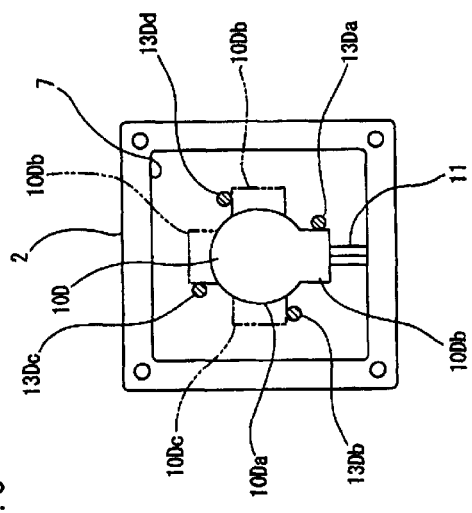
FIG. 6 is a rear view of the main portion of a further modified example in which the cover has a plurality of bar-shaped protrusion portions.

FIG. 6 shows a modified example of the cover that has a plurality of bar-shaped protrusion portions.

In this example, the power supply socket 10D has a shape in which the cord connecting section 10Db of a rectangular shape protrudes from a part of the peripheral portion of the socket's main section 10Da which is substantially circular in shape when viewed from the back. On the other hand, the cover (not shown) is provided with a plurality of bar-shaped protrusion portions 13Da, 13Db, 13Dc and 13Dd which are respectively at predetermined locations on the inner surface of the cover (not shown) so as to protrude forward.

In this modified example of FIG. 6 as well, when the cover is attached to the lamp body 2 with the power supply socket 10D connected to the base portion (not shown) of the discharge bulb 6 in the normal state, one of the bar-shaped protrusion portions 13Da through 13Dd (13Da in FIG. 6) of the cover contacts or is adjacent to the side face of the cord connecting section 10Db of the power supply socket 10D.

As a result, in this example of FIG. 6 as well, the power supply socket 10D which is connected to the base portion of the discharge bulb in the normal state is not rotated in the loosening direction. In addition, if the power supply socket 10D is not connected to the base portion of the discharge bulb in the normal state, the cover cannot be attached to the lamp body 2. Furthermore, four bar-shaped protrusion portions 13Da through 13Dd are formed on the cover. Accordingly, one type of cover (that has a plurality of bar-shaped protrusion portions) can be used for different vehicle headlamps that differ from each other in orientations of the power supply socket 10D (the chain double-dashed lines in FIG. 6 represent the different positions of the cord connecting section 10Db in a plurality of orientations) when it is attached normally. Thus, it can be said that the component (cover) is a multi-purpose device.

Figure 7:
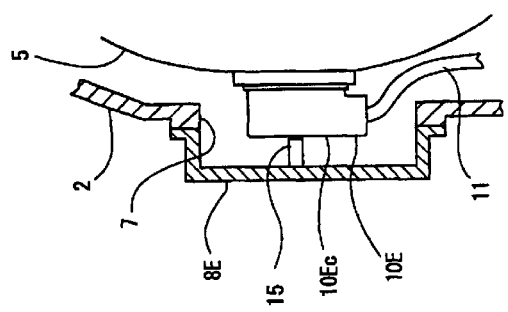
FIG. 7 shows, in longitudinal cross section, the cover of a different example.

FIG. 7 shows a modified example of the cover used in the present invention.

In this example, a pressing portion 15 is provided on the cover 8E so as to protrude from the inner face thereof. When the cover 8E is attached to the lamp body 2 with the power supply socket 10E connected to the base portion of the discharge bulb (not shown) in the normal state, the pressing portion 15 of the cover 8E come into contact with or is positioned adjacent to the rear surface 10Ec of the power supply socket 10E; in other words, the pressing portion 15 contacts or is adjacent to the surface of the power supply socket 10E that faces the cover 8E.

Accordingly, in this example of FIG. 7, even if the power supply socket 10E moves rearward (or moves to the left in FIG. 7) and is on the verge of fall from the base portion of the discharge bulb due to some reasons, the pressing portion 15 prevents the power supply socket 10E from moving rearward. The power supply socket 10E thus does not move rearward and is prevented from being detached from the base portion of the discharge bulb.

Figure 8A:
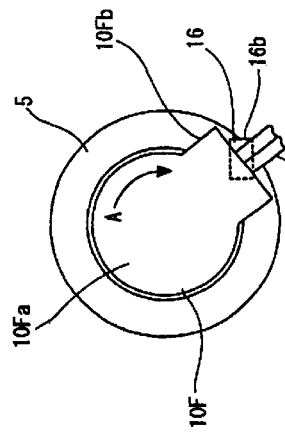
FIG. 8A is a rear view of an example in which a lock means is employed, showing the state before the power supply socket is rotated.
Figure 8B:
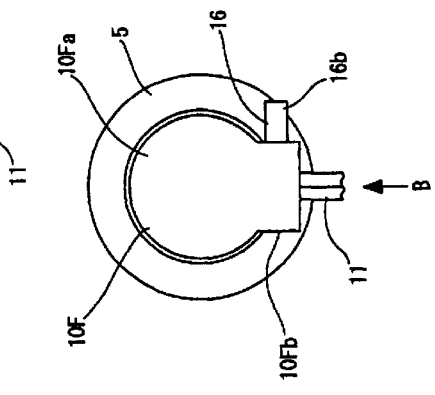
FIG. 8B is a rear view of the state in which the power supply socket is connected normally to the discharge bulb.
Figure 8C:
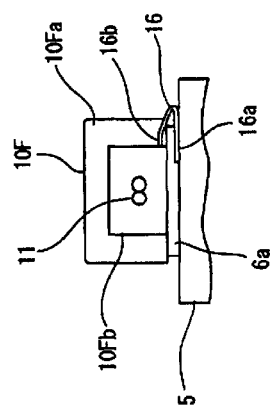
FIG. 8C is a view taken in the direction of arrow B in FIG. 8B.

FIGS. 8A through 8C show a modified example in which a lock means is provided. The lock means is engaged with a power supply socket to lock the power supply socket at a normal connection position when the power supply socket is rotated to the normal connection position.

More specifically, a lock spring 16 is fixed to the rear surface of the bulb attachment portion of the reflector 5. The lock spring 16 is obtained by forming a leaf spring material into a substantially U-shape (see FIG. 8C). A fixation piece 16a of the lock spring 16 which is on one side of the U-shape is fixed to the reflector 5, and an engagement piece 16b of the lock spring 16 which is on another side of the U-shape is positioned away from the fixation piece 16a toward the rear (or to the top of FIG. 8C).

In this structure, the main section 10Fa of the power supply socket 10F is fitted onto the base portion of the discharge bulb (not shown); and when the power supply socket 10F is thus fitted on the discharge bulb, the lock spring 16 is positioned in front of the cord connecting section 10Fb of the power supply socket 10F. In this state which is before the rotation of the power supply socket 10F (see FIG. 8A), the engagement piece 16b of the lock spring 16 is deflected forward (or toward the bottom in FIG. 8C or toward the reflector 5) by being pressed by the cord connecting section 10Fb. When the power supply socket 10F is rotated in the direction of arrow A in FIG. 8A, and it reaches the normal connection position (shown in FIG. 8B), then the cord connecting section 10Fb of the power supply socket 10F deviates from the position just behind the lock spring 16. As a result, the engagement piece 16b of the lock spring 16 which has been deflected forward by the cord connecting section 10Fb returns to its original state, and the end of the engagement piece 16b contacts the side face of the cord connecting section 10Fb of the power supply socket 10F as shown in FIGS. 8B and 8C.

Accordingly, when the power supply socket 10F is connected to the base portion of the discharge bulb in the normal state which is shown in FIGS. 8B and 8C, the rotation in the loosening direction which is the direction opposite to the direction of arrow A in FIG. 8A is prevented. Thus, once the power supply socket 10F is connected to the base portion of the discharge bulb in the normal state, the power supply socket 10F is prevented from being loosened, and the power supply socket 10F is prevented from falling off of the base portion of the discharge bulb.

Figure 9:
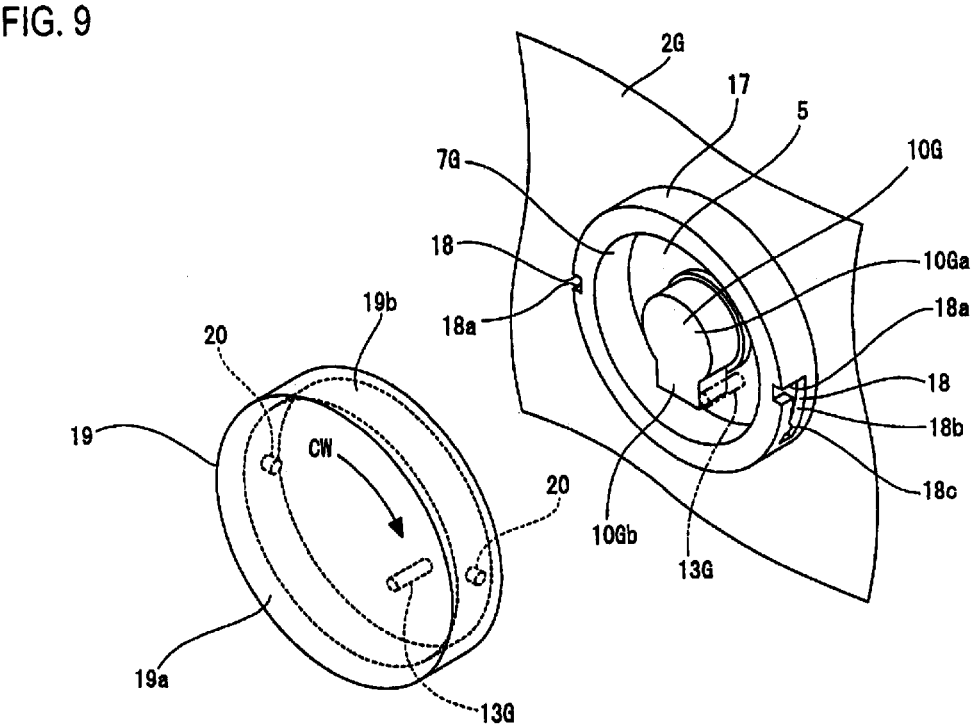
FIG. 9 is an oblique view of the main portion of the vehicle headlamp according to the second embodiment of the present invention with the cover separated from the lamp body.

FIG. 9 shows the second embodiment of the vehicle headlamp according to the present invention.

In this second embodiment, the cover is attached to the lamp body by rotation.

More specifically, the lamp body 2G is formed with a circular opening 7G on its back surface, and a circular support wall 17 is provided so as to protrude rearward from the opening edge of the opening 7G. L-shaped engagement grooves 18 are formed in two locations which are diametrically opposite to each other in the outer surface of the support wall 17. Each of the engagement grooves 18 consists of an introduction portion 18a, which opens at the rear end of the support wall 17 and extends forward, and an engagement portion 18b, which extends from the front end (or from the bottom) of the introduction portion 18a clockwise in the direction of arrow CW in FIG. 9. A self-locking projection 18C is formed in the rear surface portion so as to be at a position slightly ahead of the deepest end of the engagement portion 18b, that is, at a position slightly ahead of the far end of the engagement portion 18b from the introduction portion 18a.

A cover 19 is attached to the thus formed lamp body 2G by rotation. So as to accomplish this attachment, the cover 19 of a circular shape is comprised of a peripheral wall portion 19b that protrudes forward from the periphery of the rear surface portion 19a of the cover 19. Furthermore, a bar-shaped protrusion portion 13G is provided so as to protrude forward from a predetermined front surface position in the rear surface portion 19a of the cover 19.

Engagement protrusions 20 are provided so as to inwardly protrude at two locations that are diametrically opposite to each other in the inner face of the peripheral wall portion 19b of the cover 19.

With the structure described above, first, the engagement projections 20 of the cover 19 are aligned with the rear end of the introduction portions 18a of the engagement grooves 18 of the lamp body 2G; and then the cover 19 is moved forward or toward the lamp body 2G. As a result, the engagement projections 20 of the cover 19 are moved forward in the introduction portions 18a (or moved to the bottom of the introduction portions 18a) of the engagement projections 18 and then reach the positions which are continuous to the engagement portions 18b. The peripheral wall portion 19b of the cover 19 is thus externally fitted on the support wall 17 of the lamp body 2G. Then, the cover 19 is rotated clockwise, that is, in the direction of arrow CW in FIG. 9. As a result, the engagement projections 20 are moved toward the far end of the engagement portions 18b of the engagement grooves 18 and abut the self-locking projections 18c. Then, a slightly strong force is applied to the cover 19 so as to rotate the cover 19 further, so that the engagement projections 20 of the cover 19 go past the self-locking projections 18c and reach the ends of the engagement portions 18b due to elasticity of the materials of the cover 19 and the lamp body 2G. The cover 19 is, as a result, fitted on the lamp body 2G and is prevented from tuning back anti-clockwise in FIG. 9, and the cover 19 is assuredly retained by the lamp body 2G.

When the cover 19 is thus attached to the lamp body 2G, the bar-shaped protrusion portion 13G of the cover 19 is positioned so as to contact or is positioned adjacent to the side face of the cord connecting section 10Gb of the power supply socket 10G which is connected to the base portion of the discharge bulb (not shown) in the normal state (the position of the protrusion portion 13G is shown by the chain double-dashed line in FIG. 9). Thus, the power supply socket 10G is prevented from being rotated in the direction in which the power supply socket 10G is loosened, that is, in the direction opposite to the arrow CW direction in FIG. 9.

Therefore, when the cover 19 is attached to the lamp body 2 in a state where the power supply socket 10G is connected to the base portion of the discharge bulb in the normal state, the power supply socket 10G is prevented from falling off of the base portion of the discharge bulb, or a connection failure between the power supply socket 10G and the discharge bulb is avoided. In addition, unless the power supply socket 10G is attached in the normal state, the cover 19 cannot be attached to the lamp body 2G.

In the second embodiment, the cover 19 is attached to the lamp body 2G by rotation (that brings an engagement between two engagement projections 20 of the cover 19 and the engagement grooves 18 of the lamp body 2G) and screws are not used. It is easy to attach the cover 19 to the lamp body 2G.

It should be noted that the shape and the structure of each portion described and illustrated in the aforementioned embodiments are merely examples of embodying the present invention. It should be understood that a technical scope of the present invention is not construed in a limited manner.

As is apparent from the above, a vehicle headlamp according to the present invention includes a lamp body, a reflector which is tiltably supported by the lamp body, a discharge bulb which is fixed to the reflector, and a socket which is engaged with the discharge bulb by rotation so as to connect the discharge bulb and a lighting circuit for the discharge bulb; and the vehicle headlamp is characterized in that an opening and a cover which is detachably attached to the lamp body and closes the opening are provided in the rear portion of the lamp body at a position that corresponds to the discharge bulb, and a bar-shaped protrusion portion is provided on the cover so that, when the cover is attached to the lamp body, the protrusion portion comes into contact with or is positioned adjacent to a part of the socket, thus preventing the socket from rotating.

Accordingly, in the vehicle headlamp of the present invention, unless the socket is attached to the discharge bulb in the normal state, the cover is not attached to the lamp body because the bar-shaped protrusion portion interferes with the socket. As a result, an incomplete attachment of the socket to the discharge bulb is avoided.

Moreover, after the socket is attached to the discharge bulb in the normal state and the cover is attached to the lamp body, the bar-shaped protrusion portion of the cover prevents the socket from rotating. Therefore, the socket is prevented from falling off of the discharge bulb due to the loosening of the socket after attachment, and also a connection failure between the discharge bulb and the socket is avoided.

Furthermore, the protrusion portion of the cover has a bar shape instead of a wall shape that would make a contact with most part of the side face of the socket. Therefore, the protrusion portion does not hinder the reflector from tilting.

In the present invention, since the bar-shaped protrusion portion contacts or is positioned adjacent to the cord connecting section of the socket or the cord extending from the socket, it is not necessary to provide, in the socket, a rotation preventing element that is used exclusively to make a contact with and is positioned adjacent to the bar-shaped protrusion portion of the cover.

In the present invention, a plurality of bar-shaped protrusion portions can be formed on the cover. When the cover has a plurality of bar-shaped protrusion portions, one type of cover can be used for different types of vehicle headlamps that differ from each other in the rotation ending positions for connecting sockets because of differences in the reflector structures. As a result, the cover has high degree of versatilities.

In the present invention, a pressing portion is provided on the inner face of the cover; and when the cover is attached to the lamp body, the pressing portion contacts or is positioned adjacent to the surface of the socket that faces the cover. As a result, it is prevented that the socket falls rearward for some reasons such as vibration during driving on a rough road.

Furthermore, in the present invention, the cover is engaged with the lamp body by rotation and is thus attached to the lamp body. It is, therefore, easy to attach the cover to the lamp body.

What is claimed is:

1. A vehicle headlamp comprising a lamp body, a reflector which is tiltably supported by the lamp body, a discharge bulb which is fixed to the reflector, and a socket which is engaged with the discharge bulb by rotation so as to be attached thereto and to connect the discharge bulb and a lighting circuit, wherein:

an opening and a cover which is detachably attached to the lamp body and closes the opening are provided in a rear portion of the lamp body so as to be at a position that faces the discharge bulb, and a bar-shaped protrusion portion is provided on the cover so that the protrusion portion prevents the socket from rotating when the cover is attached to the lamp body.

2. The vehicle headlamp according to claim 1, wherein the bar-shaped protrusion portion is in contact with a part of the socket when the cover is attached to the lamp body, thus preventing the socket from rotating.

3. The vehicle headlamp according to claim 2, wherein said part of the socket in contact with the bar-shaped protrusion is a cord connecting section of the socket.

4. The vehicle headlamp according to claim 2, wherein said part of the socket in contact with the bar-shaped protrusion is a cord that extends from the socket.

5. The vehicle headlamp according to claim 1, wherein the bar-shaped protrusion portion is positioned adjacent to a part of the socket when the cover is attached to the lamp body, thus preventing the socket from rotating.

6. The vehicle headlamp according to claim 5, wherein said part of the socket being adjacent to the bar-shaped protrusion a cord connecting section formed in the socket.

7. The vehicle headlamp according to claim 5, wherein said part of the socket being adjacent to the bar-shaped protrusion is a cord that extends from the socket.

8. The vehicle headlamp according to any one of claims 1–7, wherein the bar-shaped protrusion portion is provided in a plural number.

9. The vehicle headlamp according to any one of claims 1–7, wherein the cover is provided on an inner surface thereof with a pressing portion, and the pressing portion comes into contact with a surface of the socket, the surface facing the cover when the cover is attached to the lamp body.

10. The vehicle headlamp according to anyone of claims 1–7, wherein the cover is provided on an inner surface thereof with a pressing portion, and the pressing portion is positioned adjacent to a surface of the socket, the surface facing the cover when the cover is attached to the lamp body.

11. The vehicle headlamp according to claim 8, wherein the cover is provided on an inner surface thereof with a pressing portion, and the pressing portion comes into contact with a surface of the socket, the surface facing the cover when the cover is attached to the lamp body.

12. The vehicle headlamp according to claim 8, wherein the cover is provided on an inner surface thereof with a pressing portion, and the pressing portion is positioned adjacent to a surface of the socket, the surface facing the cover when the cover is attached to the lamp body.

13. The vehicle headlamp according to any one of claims 1–7, wherein the cover is engaged with the lamp body by rotation and thus attached to the lamp body.

* * * * *